United States Patent [19]

Ando et al.

[11] Patent Number: 4,639,270

[45] Date of Patent: Jan. 27, 1987

[54] METHOD FOR PREPARING A COATING COMPOSITION FOR USE TO PRODUCE HEAT-SENSITIVE RECORD MATERIAL

[75] Inventors: Masatoshi Ando, Nishinomiya; Hiromine Mochizuki; Kazuta Saito, both of Amagasaki, all of Japan

[73] Assignee: Kanzaki Paper Manufacturing Co., Ltd., Tokyo, Japan

[21] Appl. No.: 517,774

[22] Filed: Jul. 27, 1983

[30] Foreign Application Priority Data

Jul. 30, 1982 [JP] Japan ............................... 57-134038

[51] Int. Cl.[4] ............................................ C09D 11/00

[52] U.S. Cl. ...................................... 106/21; 346/208; 346/214; 427/148; 427/150

[58] Field of Search .......................... 106/21; 282/27.5; 427/150, 148; 346/208, 214

[56] References Cited

U.S. PATENT DOCUMENTS

| | | | |
|---|---|---|---|
| 4,236,732 | 12/1980 | Murakami et al. | 282/27.5 |
| 4,428,978 | 1/1984 | Jabs et al. | 427/150 |
| 4,434,049 | 2/1984 | Dean et al. | 208/153 |

*Primary Examiner*—Amelia B. Yarbrough

*Attorney, Agent, or Firm*—Morgan & Finnegan

[57] ABSTRACT

A coating composition for use to produce heat-sensitive record material is produced by admixing and heating at least one colorless chromogenic material or acceptor and at least one heat fusible material having a melting point within the range of 60° C. to 200° C. to form a co-melt, atomizing the co-melt with a spray nozzle to form finely divided particles comprising the colorless chromogenic material or acceptor and the heat fusible material, and preparing a coating composition including said finely divided particles dispersed therein.

13 Claims, 4 Drawing Figures

METHOD FOR PREPARING A COATING COMPOSITION FOR USE TO PRODUCE HEAT-SENSITIVE RECORD MATERIAL

BACKGROUND OF THE INVENTION

This invention relates to an improved method for preparing a coating composition for use the production of a heat-sensitive record material which has an improved heat-sensitivity and is adapted for a high speed recording.

This is known a heat-sensitive record material comprising a base sheet having a color developing layer which includes finely divided particles of one of colorless chromogenic materials such as triphenylmethane compounds, fluoran compounds, auramine compounds and spiropyran compounds and finely divided particles of one of organic acceptors such as phenolic compounds, aromatic carboxylic acids and their polyvalent metal salt and/or one of inorganic acceptors such as activated clay, acid clay, attapulgite, aluminum silicate and talc. In such the heat-sensitive record material like this the above mentioned two kinds of particles are, when at least one of them is melted or sublimated at an elevated temperature, brought into intimate contact with each other to develop a color. Accordingly, a relatively high temperature is required for obtaining clear and distinct color images. This is apparently disadvantageous since clear and distinct color images can never be expected at a high speed recording.

On the other hand, recently, with remarkable advance of the heat sensitive recording machines, it has become possible to speed-up heat sensitive facsimile systems and heat sensitive printers utilizing improved thermal heads. For example, now there are available heat sensitive facsimile systems having the capacity of a recording speed of 20 seconds or shorter for a DIN A4 size paper sheet and heat sensitive printers having the capacity of a recording speed of 120 or more letters/sec. As a result of such speed-up in the field of hardware, there has been a demand for higher sensitivity of heat-sensitive record material to be used. To meet this demand, studies have been conducted to try to find colorless chromogenic materials and acceptors having higher sensitivity, to incorporate a sensitizing agent to the record material; and to obtain particles of colorless chromogenic materials and acceptors having reduced particle sizes through the utilization of improved manners of pulverization.

U.S. Pat. No. 4,236,732 or Japanese Laid-Open Patent Publication No. 48,751 of 1978 proposes to co-melt a colorless chromogenic material or an acceptor with a heat fusible material having such a relatively low melting point as 60° C. to 200° C. The heat-sensitive record material obtained by utilizing this co-melting technique is immediately heat responsive and has a good heat-sensitivity at a low temperature so that it can be used as a record material for high speed recording machines such as facsimiles, electronic computers and telex machines.

The above-mentioned co-melting technique, however, has a disadvantage that the production of a dispersion in which solid particles of a co-melt of a colorless chromogenic material or an acceptor and a heat fusible material are dispersed is not always easy. U.S. Pat. No. 4,236,732 or Japanese Laid-Open Patent Publication No. 48,751 of 1978 discloses two manners for obtaining solid particles of a co-melt of a colorless chromogenic material or an acceptor and a heat fusible material. One is to admix a colorless chromogenic material or an acceptor with a heat fusible material in a co-melted state, cool the mixture and then pulverize the obtained mass into finely divided particles utilizing a ball mill or any other pulverizer. The other is to admix a colorless chromogenic material or an acceptor with a heat fusible material in a molten state and then disperse and emulsify the melted mixture in a dispersion medium. These two manners for obtaining solid particles of a co-melt of a colorless chromogenic material or an acceptor and a heat fusible material are not always practically applicable for any kind of heat fusible material. However, if the target particle size of the particles is set to about 4–5 microns, this can hardly be attained using a ball mill or even if the material is to be processed by a sand mill, at present it must be processed at least 3–4 times. Thus, there are problems that the pulverization treatment requires much labor and time and that despite this time-consuming treatment, the resulting particle size distribution is not always uniform. Further, the equipment itself is complicated and expensive and expenses for treatment operation are substantial, consequently affecting the cost of the heat-sensitive record material. A further problem is that with the equipment in use, it is difficult to prepare the coating composition in a continuous operation.

The primary object of the invention is to provide an improved method for preparing a coating composition including solid particles of a co-melt of at least one colorless chromogenic material or acceptor and at least one heat fusible material in which the above-mentioned disadvantages involved with the conventional techniques can be avoided.

Another object of the invention is to provide an improved method for the production of finely divided solid particles having relatively uniform and relatively reduced particle sizes of a co-melt of a colorless chromogenic material or acceptor and a heat fusible material.

Other objects and advantages of the invention are apparent from the following detailed description.

BRIEF EXPLANATION OF THE DRAWINGS

Some preferred embodiments of the spraying apparatus useful to carrying out the step of producing finely divided particles of a co-melt of colorless chromogenic material or acceptor and heat fusible material according to the invention are illustrated in the drawings, wherein.

SUMMARY OF THE INVENTION

Figure 1:
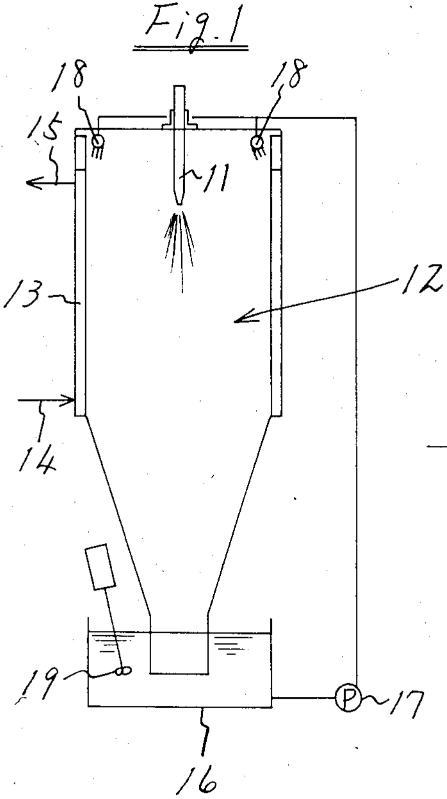
FIG. 1 is a schematic view of an embodiment of the device for carrying out the spraying step according to the invention.

The method for preparing a coating composition for use to produce a heat-sensitive record material according to the invention comprises the steps of admixing and heating at least one colorless chromogenic material or acceptor and at least one heat fusible material to form a co-melt, atomizing said co-melt with a spray nozzle to form finely divided particles comprising said colorless chromogenic material or acceptor and said heat fusible material, and preparing a coating composition including said finely divided particles dispersed therein.

DETAILED DESCRIPTION OF THE INVENTION

The present invention relates to a method for preparing a coating composition useful to produce a heat-sensitive record material comprising a base sheet having a color developing layer which includes finely divided particles comprising colorless chromogenic material and finely divided particles comprising acceptor which is reactive with said colorless chromogenic material to develop a color.

According to the invention, as the first step for preparing the coating composition useful for the production of a heat-sensitive record material, at least one colorless chromogenic material or acceptor and at least one heat fusible material are admixed and the admixture is heated to form a co-melt.

Any of various known colorless chromogenic materials may be used for the present invention. Among them there are included, by way of examples, 3,3-bis(p-dimethylaminophenyl)-6-dimethylaminophthalide (CVL), 3,3-bis(p-dimethylaminophenyl)-phthalide, 3-(p-dimethylaminophenyl)-3-(1,2-dimethylindole-3-yl)-phthalide, 3-(p-dimethylaminophenyl)-3-(2-methylindole-3-yl)-phthalide, 3,3-bis-(1,2-dimethylindole-3-yl)-5-dimethylaminophthalide, 3,3-bis-(1,2-dimethylindole-3-yl)-6-dimethylaminophthalide, 3,3-bis-(9-ethylcarbazole-3-yl)-6-dimethylaminophthalide, 3,3-bis-(2-phenylindole-3-yl)-6-dimethylaminophthalide, 3-p-dimethylaminophenyl-3-(1-methylpyrrole-3-yl)-6-dimethylaminophthalide, 4,4′-bis-dimethylaminobenzhydryl-benzylether, N-halophenyl-leucoauramine, N-2,4,5-trichloropheynyl-leucoauramine, rhodamine-B-anilinolactam, rhodamine-(p-nitroanilino)-lactam, rhodamine-(o-chloroanilino)lactam, 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluroan, 3-diethylamino-6,7-dimethylfluoran, 3-(N-ethyl-p-toluidino)-7-methylfluoran, 3-diethylamino-7-(N-acetyl-N-methylamino)fluoran, 3-diethylamino-7-N-methylaminofluoran, 3-diethylamino-7-dibenzyl-aminofluoran, 3-diethylamino-7-(N-methyl-N-benzylamino)-fluoran, 3-diethylamino-7-(N-chloroethyl-N-methylamino)fluoran, 3-diethylamino-7-diethylaminofluoran, 3-(N-ethyl-p-toluidino)-6-methyl-7-phenylaminofluoran, 3-(N-ethyl-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-ethyl-N-isoamylamino)-6-methyl-7-phenylaminofluoran, 3-(N-cyclohexyl-N-methylamino)-6-methyl-7-phenylaminofluoran, 3-pyrrolidino-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)-fluroan, 3-dibutylamino-7-(o-chlorophenylamino)fluoran, 3-pyrrolidino-6-methyl-7-p-butylphenylaminofluoran, benzoylleucomethyleneblue, p-nitrobenzoyl-leucomethyleneblue, 3-methylspiro-dinaphtopyran, 3-ethyl-spiro-dinaphthopyran, 3-phenyl-spiro-dinaphthopyran, 3-benzylspiro-dinaphthopyran, 3-methyl-naphtho(6′-methoxy-benzo)-spiropyran and 3-propyl-spiro-dibenzopyran. The above colorless chromogenic materials may be used either solely or in combination.

Various composition are known as acceptors for the heat-sensitive record material. Among them, there are included: inorganic acidic materials such as activated clay, acid clay, attapulgite, bentonite, colloidal silica and aluminum silicate; phenolic compounds such as 4-tert-butylphenol, 4-tert-octylphenol, 4-phenylphenol, 4-acetylphenol, α-naphthol, β-naphthol, hydroquinone, 2,2′-dihydroxydiphenyl, 2,2′-methylenebis-(4-methyl-6-tert-butylphenol), 2,2′-methylenebis-(4-chlorophenol), 4,4′-dihydroxy-diphenylmethane, 4,4′-isopropylidenediphenol, 4,4′-isopropylidenebis(2-tert-butylphenol), 4,4′-sec-butylidenediphenol, 4,4′-cyclohexylidenediphenol, 4,4′-dihydroxydiphenyl sulfide, 4,4′-thiobis(6-tert-butyl-3-methylphenol), 4,4′-dihydroxydiphenyl sulfone, 4-hydroxybenzoic acid benzylester, 4-hydroxyphthalic acid dimethylester, hydroquinone monobenzyl ether, novolak phenol resin and other phenol polymers; aromatic carboxylic acid such as benzoic acid, p-tert-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-tert-butylsalicylic acid, 3-benzylsalicylic acid, 3-(α-methylbenzyl)salicylic acid, 3-chloro-5-(α-methylbenzyl)salicylic acid, 3,5-di-tert-butyl-salicylic acid, 3-phenyl-5-α,α-dimethylbenzylsalicylic acid, 3,5-di-α-methylbenzylsalicylic acid; and organic acidic materials such as polyvalent metal salts of the above itemized phenolic compounds or aromatic carboxylic acid. Among the polyvalent metals which can form such metallic salts like this, there are included zinc, magnesium, aluminum, calcium, titanium, manganese, tin and nickel. The above enumerated acceptors may be used either solely or in combination.

The heat fusible material used in the present invention should have a melting point within the range of 60° C. to 200° C., preferably within the range of 65° C. to 120° C. and be capable of dissolving at least one of the colorless chromogenic material and the acceptor therein when melted. Some of the compounds enumerated as acceptors in the above may meet these requirements. Any of such compounds can never been incorporated to any colorless chromogenic material to prepare finely divided particles including colorless chromogenic material because a color developing reaction occurs when they are bonded together. Those compounds can only be useful to prepare acceptor particles in combination with any other acceptive compounds.

In view of the above limitation preferred heat fusible materials are those which do not react on any colorless chromogenic material to produce a color when brought into contact in a liquid phase with the latter. Among those heat fusible materials there may be included the following compounds:

| | m.p. (°C.) |
|---|---|
| 2,6-diisopropylnaphthalene | 68 |
| 1,4,5-trimethylnaphthalene | 63 |
| 2,3,5-trimethyl-naphthalene | 146 |
| 2,3,6-trimethyl-naphthalene | 102 |
| 1,5-dimethylnaphthalene | 82 |
| 1,8-dimethylnaphthalene | 65 |
| 2,3-dimethylnaphthalene | 105 |
| 2,6-dimethylnaphthalene | 113 |
| 2,7-dimethylnaphthalene | 98.5 |
| 1,2,3,4-tetramethylnaphthalene | 106 |
| 1,3,6,8-tetramethylnaphthalene | 85 |

-continued

| | m.p. (°C.) |
|---|---|
| 1,4,5,8-tetramethylnaphthalene | 131 |
| 1,2,6,7-tetramethyl-4-isopropylnaphthalene | 103 |
| 1,3,6,7-tetramethyl-4-isopropylnaphthalene | 97 |
| 2,7-di-tert-butylnaphthalene | 104 |
| 1,2-dio-o-tolylethane | 66 |
| α-methyl-4,4'-di-tert-butyldiphenylmethane | 94 |
| 1,2-di-p-tolylethane | 82 |
| 1,2-bis(4-ethylphenyl)ethane | 69.8 |
| 1,1,2,2-tetramethyl-1,2-di-p-tolyethane | 159 |
| α,β-bis(tert-butylphenyl)ethane | 149 |
| 2,3-di-m-tolylbutane | 97 |
| 2,3-dimethyl-2,3-di-p-tolylbutane | 158 |
| diphenyl-p-tolylmethane | 72 |
| 1,2-dibenzylbenzene | 78 |
| 1,4-dibenzylbenzene | 86 |
| diphenyl-o-tolylmethane | 83 |
| 3,4-diphenylhexane | 92 |
| 1,2-bis(2,3-dimethylphenyl)ethane | 112 |
| 1,2-bis(2,4-dimethylphenyl)ethane | 72 |
| 1,2-bis(3,5-dimethylphenyl)ethane | 86 |
| 4'-methyl-4'-α-methyl-p-methylbenzyl-1,1-diphenylethane | 85 |
| bis(2,4,5-trimethylphenyl)methane | 98 |
| bis(2,4,6-trimethylphenyl)methane | 135 |
| 1,2-bis(2,4,6-trimethylphenyl)ethane | 118 |
| (2,3,5,6-tetramethylphenyl)-(4-tert-butylphenyl)methane | 117 |
| 1,6-bis(2,4,6-trimethylphenyl)hexane | 74 |
| bis(2,6-dimethyl-4-tert-butylphenyl)methane | 135 |
| 1,18-diphenyloctadecane | 61 |
| 4,4'-dimethylbiphenyl | 121 |
| 2,4,6,2',4',6'-hexamethylbiphenyl | 101 |
| 4,4'-di-tert-butylbiphenyl | 128 |
| 2,6,2',6'-tetramethylbiphenyl | 67 |
| 1,3-terphenyl | 87 |
| stearic acid amide | 99 |
| stearic acid methylenebisamide | 140 |
| oleic acid amide | 68–74 |
| palmitic acid amide | 95–100 |
| physeteric acid amide | 65–72 |
| coconut fatty acid amide | 85–90 |

and N-methylamides, anilides, β-naphthylamides, N-(2-hydroxyethyl)-amides, N-(mercaptoethyl)amides, N-octadecylamides, phenylhydrazides.

Among the above compounds, fatty acid amides are most preferred because fatty acid amides are compatible with colorless chromogenic materials and useful in enhancing the sensitivity in low temperatures and the heat response of the heat-sensitive record materials.

The above enumerated heat fusible materials may be used either solely or in combination at will.

The amount of the heat fusible material depends on the properties of the heat fusible material and the colorless chromogenic material or acceptor used. However, generally speaking, the amount of the heat fusible material would be within the range of 0.2 to 30 parts, preferably 0.5 to 10 parts, by weight per 1 part by weight of the colorless chromogenic material used.

The heat fusible material may be incorporated to either chromogenic material or acceptor or both to form a co-melt or co-melts. However, it may be said that incorporation of a heat fusible material to colorless chromogenic material would be more advantageous than incorporation of heat fusible material to acceptor since in the former case recrystallization can be considerably prevented and accordingly a good heat sensitivity at lower temperature can be secured.

According to the invention in order to obtain finely divided particles of the above described co-melt atomization of the co-melt in a molten state is carried out with use of a spray nozzle. The type of the spray nozzle used and the optimum conditions for atomization will be suitably selected according to the target value of the particle size.

FIG. 1 schematically illustrates a device for atomization with a spray nozzle to obtain finely divided particles of the co-melt described. Referring now to FIG. 1, a spray nozzle 11 is installed in an arresting chamber 12 which is maintained in a cooled condition. A coolant is circulated through the jacket 13 defining the arresting chamber 12 to keep the arresting chamber 12 in a cooled condition. The reference numerals 14 and 15 indicate an inlet and an outlet for the coolant, respectively.

The co-melt in a molten state is atomized from the spray nozzle 11 located at the top of the chamber 12 toward the bottom of the chamber 12 where a reservoir 16 is located to receive and collect atomized co-melt particles. The reservoir 16 contains a dispersion medium therein so that atomized co-melt particles can be dispersed therein. Typically the dispersion medium may be water including a dispersing agent. A part of the dispersion medium is returned by a pump 17 to a plurality of shower nozzles 18 through where the dispersion medium is sprayed toward the inner wall of the chamber 12. In this manner any atomized fine particles of the co-melt adhered to the inner wall of the chamber 12 can be washed away.

Preferably, the reservoir 16 is provided with an agitator 19 so that a homogeneous dispersion may be formed in the reservoir 16.

The spray nozzle 11 may be of any known type so far as it can atomize the liquid co-melt into finely divided particles having desired particle sizes.

Figure 2:
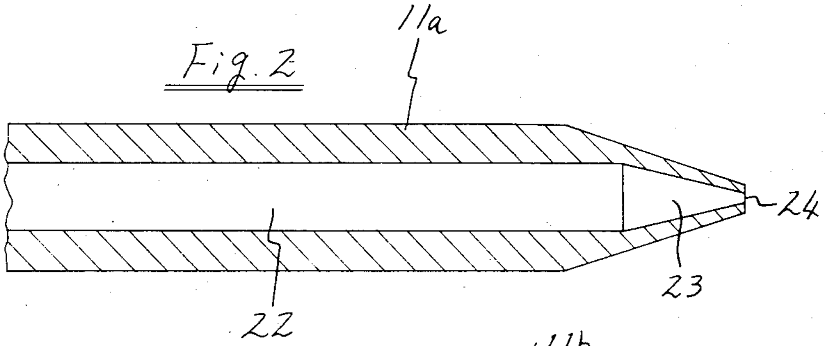
FIG. 2 is a sectional view of a nozzle of a single-fluid type useful in the device illustrated in FIG. 1.

FIG. 2 shows a spray nozzle of a single fluid flow type. Referring to FIG. 2, the co-melt in a liquid phase is pressed into the nozzle 11*a* through its centrally disposed and axially extending passage 22, passed through a constricting region 23 and sprayed out from a nozzle tip opening 24 to be atomized into finely divided particles. With use of such the nozzle of a single fluid flow type as illustrated in FIG. 1 the particle size of the atomized material can be reduced to a greater extent by increasing the outflow rate of the co-melt from the nozzle tip opening 24, but generally the possible minimum particle size would be limited to about 4 to 5 microns.

Figure 3:
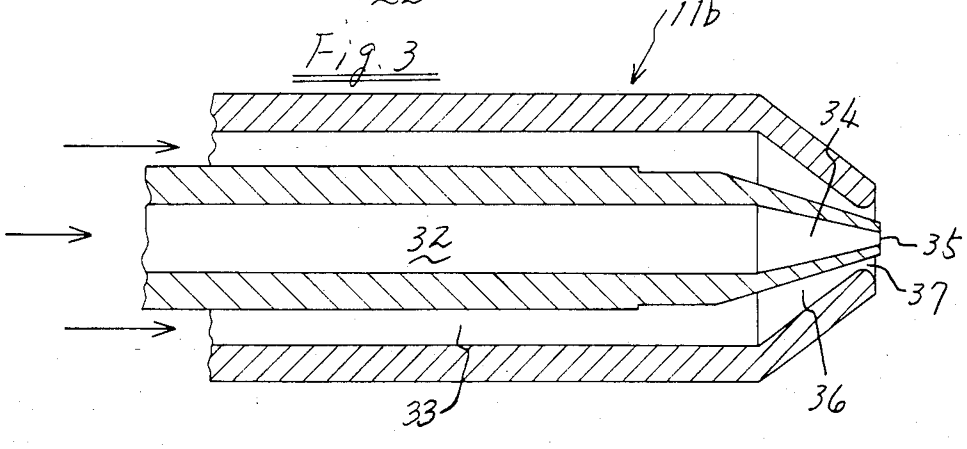
FIG. 3 is a sectional view of another nozzle of a two-fluid type useful in the device illustrated in FIG. 1.

FIG. 3 illustrates by way of example a spray nozzle of a two-fluid flow type which is also useful for the device illustrated in FIG. 1. Referring to FIG. 3, the spray nozzle 11*b* is generally formed in a double tube form having a centrally disposed passage 32 and an outer passage 33 surrounding said centrally disposed passage 32. The passage 32 is communicated through a constricting region 34 to a central nozzle tip opening 35. The passage 33 is communicated through its constricting region 36 to an annular nozzle tip opening 37.

The co-melt is pressed into and passed through the passage 32 while high pressure steam or air is passed through the passage 33 so that the two fluids are sprayed out together from the nozzle opening structure consisting a central opening 35 and an annular opening 37. In this manner more finely divided particles of the co-melt can be obtained. In this case, the flow rate of the high pressure steam or air from the passage 33 is made greater than that of the co-melt from the central passage 32, whereby the particle size of the co-melt can be made still smaller. For example, when the target value of the particle size of the co-melt is set to 4–5 microns, this can be achieved by making the flow rate of the co-melt in the molten state less than half that of the high pressure steam or air and making the steam or air pressure greater than 3 kg/cm$^2$.

Figure 4:
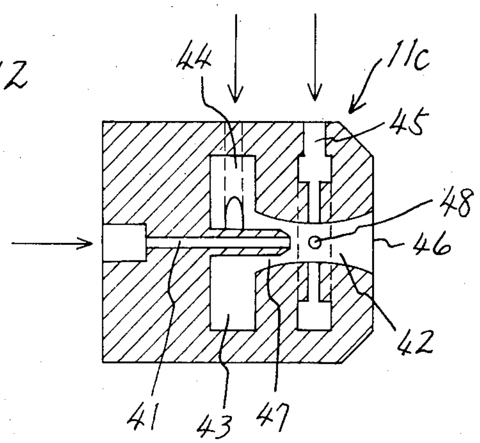
FIG. 4 is a sectional view of a further nozzle of a three-fluid type useful in the device illustrated in FIG. 1.

FIG. 4 illustrates by way of example a spray nozzle of a three-fluid flow type which is also useful for the device illustrated in FIG. 1. Referring to FIG. 4, the spray nozzle 11*c* includes a centrally disposed, axially extending passage 41 for a first fluid which is communicated to a throat portion 42. Around the central passage 41 there is formed an annular chamber 43 which is communicated with another passage 44 for supplying a second fluid. The chamber 43 is also communicated to the throat portion 42. The throat portion 42 is further communicated with further passage 45 for supplying a third fluid. This throat portion 42 constitutes a junction for the three different fluids which are spouted together through a single nozzle tip opening 46.

With use of the three fluid flow type nozzle 11*c* illustrated in FIG. 4, the co-melt in the hot molten state is pressed through a central passage 41 and sprayed along the centerline toward a throat portion 42. On the other hand, high pressure steam or air is circumferentially blown through a circumferentially formed hole from the second passage 44 into the annular chamber 43 to generate potential vortexes around the centerline. When the steam or air accompanied by potential vortexes flows through the throat portion 42, it is constricted in the constricting region 47 and thereby accelerates to a great extent, and moreover since it is accompanied by potential vortexes, it instantaneously atomizes the co-melt spouting from the central passage 41 and at the same time it also atomizes an aqueous solution of a dispersing agent being injected from the third passage 45 into the throat portion 42 through inlets 48 formed at 4 places in the circumference of the portion 42. In the throat portion 42 finely divided particles of the co-melt and the dispersing agent are uniformly admixed and stirred before the three fluids are spouted together from the nozzle tip opening 46. Thus, the three-fluid flow nozzle provides a more uniform distribution of particle size than the single-fluid and two-fluid nozzles. Therefore, a heat-sensitive record material using this type of fine particles is superior to one obtained by the conventional method in the heat response and the recording density. Further, to obtain a given average particle size, the steam or air pressure to be used can be made much lower than in the case with use of a single-fluid or two-fluid nozzle. This is advantageous from the view point of easier and safer working. Further, the particle size of the co-melt can be reduced to a greater extent by making the flow rate of the high pressure steam or air from the circumferentially formed passage 44 greater than that of the co-melt from the central passage 41. The aforesaid three-fluid nozzle may be installed in an arresting chamber 12 in a cooling atmosphere. In this case, unlike the single-fluid or two-fluid nozzle, since the aqueous solution of the dispersant was already incorporated when atomization takes place, it is not always necessary to previously put a dispersion medium in the reservoir 16.

The co-melt atomized by the spray nozzle into finely divided particles is solidified in the arresting chamber 12 which is maintained in a cooled condition. Preferably, the arresting chamber 12 is maintained at a temperature lower than the melting point of the co-melt so that aggregation of the atomized particles to form clusters may be prevented. Especially in the case of using a spray nozzle of a single fluid or two-fluid flow type, the temperature in the arresting chamber 12 should be lower, preferably by at least 10° C., than the melting point of the co-melt. In the case of using a spray nozzle of a three-fluid flow type it is not always necessary to maintain the arresting chamber 12 at a positively cooled condition.

It is not necessary to specifically control the temperature of the aqueous solution of a dispersing agent which is sprayed together with the co-melt from the three-fluid flow spray.

It is not necessary to positively cool the reservoir 16 where the finely divided particles of the co-melt are collected in the form of an aqueous dispersion so far as the finely divided particles of the co-melt are entirely solidified in the arresting chamber 12. However, if the arresting chamber 12 is not positively cooled, for example, as in the case of using a three-fluid flow type spray nozzle, it is preferred to cool the reservoir 16 at a temperature lower than the melting point of the co-melt, most preferably, at a temperature lower by at least 10° C. than the melting point of the co-melt.

In the reservoir 16, preferably, a 20 to 30% aqueous dispersion of finely divided particles of the co-melt may be prepared.

Finely divided particles of colorless chromogenic material or acceptor may further include inorganic metal compounds and/or inorganic pigments which are useful to improve the color developing ability of the organic acceptor and the light resistance.

If those inorganic metal compounds and/or inorganic pigments are incorporated to any colorless chromogenic material they must be substantially non reactive on the colorless chromogenic material. Among useful metal compounds there are included, by way of examples, zinc oxide, magnesium oxide, calcium oxide, barium oxide, aluminum oxide, tin oxide, magnesium hydroxide, aluminum hydroxide, calcium hydroxide, zinc hydroxide, tin hydroxide, magnesium carbonate, zinc carbonate, calcium carbonate. Among useful inorganic pigments there may be enumerated various white pigments such as kaolin, clay, barium sulfate, zinc sulfide. The amount of such inorganic metal compounds and inorganic pigments is preferably within the range of 4 parts or less by weight per one part by weight of the organic acceptor used.

The dispersion of the finely divided particles of the co-melt comprising a colorless chromogenic material or acceptor and a heat fusible material obtained in the above mentioned manner is used to prepare a coating composition for the production of a heat-sensitive material. In the coating composition, whether it includes colorless chromogenic material particles or acceptor particles, a binder such as starch, modified starch, hydroxyethyl cellulose, methyl cellulose, carboxymethylcellulose, gelatin, casein, gum arabic, polyvinyl alcohol, styrene-maleic anhydride copolymer emulsion, styrene-butadiene copolymer emulsion, vinylacetate-maleic anhydride copolymer emulsion, salts of polyacrylicacid is used in an amount of 10 to 40% by weight, preferably 15 to 30% by weight with respect to the total solid amount. In the coating composition various agents and additives may be used. For example, in order to improve the color developing ability, enhance the light resistance and obtain matting effect the before-mentioned inorganic metal compounds and inorganic pigments may be added in an amount of 0.1 to 5 parts by weight, preferably 0.2 to 2 parts by weight per one part of the acceptor used. Further dispersing agents such as sodium dioctylsulfosuccinate, sodium dodecylbenzenesulfonate, sodium laurylalcoholsulfuric acid ester and metal salts of fatty acid, ultraviolet ray absorbing agents such as benzophenone derivatives and triazol derivatives, defoaming agents, fluorescent dyes, coloring dyes may also be added to the coating compoistion. The coating composition may also contain dispersion or emulsion including stearic acid, polyethylene, carnauba wax, paraffin wax, zinc stearate, calcium stearate, ester wax in order to prevent the heat-sensitive record material from being stuck in contact with stylus of a recording head.

Any known manners may be used for the preparation of the coating composition. For example, if the material to be co-melted with the heat fusible material is a colorless chromogenic material, a first dispersion of finely divided particles of the co-melt may be mixed with a second dispersion comprising an acceptor (which may be an organic acceptor or an inorganic acceptor), a binder and other agents to form a single coating composition, the second dispersion being subjected to a treatment with a sand mill or ball mill for pulverization before mixing with the first dispersion. If the material to be co-melted with the heat fusible material is a color acceptor (which, in this case, is an organic acceptor), the first dispersion of the finely divided particles of the co-melt is mixed with a second dispersion comprising a colorless chromogenic material, a binder and other agents to form a single coating composition, the second dispersion being subjected to a pulverization treatment with a sand mill or ball mill before mixing with the first dispersion.

For a two step coating two coating compositions in which colorless chromogenic material particles and acceptor particles are respectively dispersed are prepared separately. Each or either of the two compositions may be prepared according to the manner as described before according to the invention.

Generally, in the color developing layer of a heat-sensitive record material the amount of the acceptor is larger than the amount of the colorless chromogenic material. Usually, the amount of the acceptor is within the range of 1 to 50 parts by weight, preferably 4 to 10 parts by weight, per one part by weight of colorless chromogenic material.

The color developing layer including finely divided particles of colorless chromogenic material and finely divided particles of acceptor, at least one of said two kinds of finely divided particles further including a heat fusible material incorporated thereto, may be formed by coating a suitable base sheet either by a single step coating with the single coating composition or by a two step coating with the two separately prepared coating compositions.

The base sheet may be any of known types. The typical sheet material would be papers, plastic films and synthetic papers. If the base sheet is transparent the recorded sheet may be used as the second copying master. The amount of the coating composition for forming the color developing layer is not particularly limited but usually it would be within the range of 2 to 12 $g/m^2$ preferably 3 to 7 $g/m^2$ on dry basis.

Thus, according to the present invention, the heat fusible material which is incorporated to either colorless chromogenic material or acceptor can be changed to fine particles uniform in particle size distribution in a short time, and a heat-sensitive record material using said fine particles is superior to any heat-sensitive record material obtained by the conventional method both in the heat response and in the recording density. Further, the equipment for the production of same is simple and convenient and inexpensive, and the costs for the working operation are low. Thus, the invention contributes much to improvement of the quality and reduction of the cost for the production of the heat-sensitive record material.

DETAILED DESCRIPTION OF THE PREFERRED EMBODIMENTS

The following examples serve to illustrate the invention in more detail although the invention is not limited to the examples. Unless otherwise indicated, parts and % signify parts by weight and % by weight, respectively.

Atomization was conducted through the utilization of the device illustrated in FIG. 1.

EXAMPLE 1

(1) Treatment for incorporation of a colorless chromogenic material and a heat fusible material using a single fluid flow type nozzle:

| | |
|---|---|
| 3-(N—ethyl-p-toluidino)-6-methyl-7-phenylaminofluoran | 50 parts |
| 3-(N—cychlohexyl-N—methylamino)-6-methyl-7-phenylaminofluoran | 50 parts |
| stearic acid amide | 400 parts |

The above mixture was melted at 165° C., pressurized to 200 $kg/cm^2$ by a 2-stage gear pump and sprayed through a single fluid flow type nozzle (having an outlet diameter of 1 mm) as shown in FIG. 2 into the arresting chamber 12 (FIG. 1) controlled in a cooling atmosphere of 30° C. by supplying water of 5° C. to the jacket 13 (FIG. 1). The cooled and solidified fine particles were collected in water maintained at 30° C. in the reservoir 16 (FIG. 1), said water including 3.5% by weight of sodium dialkylsulfosuccinate (PELEX-TR manufactured by Kao-Atlas) and 1.5% by weight of methylcellulose. The average particle size of the co-melt obtained was about 4 microns and the content of the co-melt in the dispersion obtained was 25% by weight. The co-melting point of the co-melt was about 90° C.

(2) Preparation of A liquid:

| | |
|---|---|
| The aforesaid co-melt thus prepared | 100 parts (solid content) |
| Kaolin | 20 parts |
| 10% aqueous solution of polyvinyl alcohol | 300 parts |

The above components were mixed to provide an A solution.

(3) Preparation of B liquid:

| | |
|---|---|
| 4,4'-isopropylidene diphenol (bisphenol A) | 100 parts |
| Kaolin | 20 parts |
| Zinc stearate | 20 parts |
| Sodium dialkylsulfosuccinate (PELEX-TR manufactured by Kao-Atlas) | 10 parts |
| 10% aqueous solution of polyvinyl alcohol | 300 parts |

The above composition was treated by a sand mill to be pulverized to an average diamter of 4 microns.

(4) Formation of a recording layer:

| | |
|---|---|
| A liquid | 200 parts |
| B liquid | 100 parts |

In the above ratio, the two dispersions were mixed to provide a coating solution. This coating solution was applied to a paper substrate of 50 g/m$^2$ so that the amount of coating on the substrate after drying was 10 g/m$^2$ to obtain a heat-sensitive record material.

EXAMPLE 2

(1) Treatment for incorporation of a colorless chromogenic material and a heat fusible material using a two-fluid flow nozzle:

A co-melt having the same composition as that mentioned in (1) of Example 1 was pressed into the central passage 32 of the two-fluid flow nozzle 11*b* (having a central outlet diameter of 3 mm) shown in FIG. 3 and was sprayed through the outlet 35. On the other hand, high pressure steam controlled under a pressure of 13 kg/cm$^2$ and at a temperature of about 180° C. was spouted through the passage 33 from the annular opening 37. This two-fluid flow type nozzle was installed in the device shown in FIG. 1, so that the co-melt was sprayed into the arresting chamber 12 which was maintained at 30° C. by passing water of 5° C. through the jacket 13 and the cooled and solidified fine particles were collected in water in the reservoir 16 to form a dispersion of the fine particles, the water including as dispersing agents 3.5% weight of sodium dialkylsulfosuccinate (PELEX-TR manufactured by Kao-Atlas) and 1.5% by weight of methylcellulose therein. In this case, the flow rate of the high pressure steam was 5 times that of the co-melt. As a result, the average particle size of the co-melt obtained was about 4 microns and the particle size distribution was more uniform than that in Example 1. The content of the co-melt in the dispersion obtained was 22% by weight.

(2) Preparation of A liquid:

It was preapred in the same manner as in (2) of Example 1.

(3) Preparation of B liquid:

It was prepared in the same manner as in (3) of Example 1.

(4) Formation of a recording layer:

| | |
|---|---|
| A liquid | 200 parts |
| B liquid | 100 parts |

A coating composition prepared by mixing the A and B liquids, in the above ratio was applied under the same conditions as described in Example 1, whereby a heat-sensitive record material was obtained.

EXAMPLE 3

(1) Treatment for incorporation of a colorless chromogenic material and a heat fusible material using a three-fluid flow type nozzle:

A co-melt having the same composition as that mentioned in (1) of Example 1 was pressed into the central passage 41 of the three-fluid flow type nozzle (having a central outlet diameter of 3 mm) shown in FIG. 4 and was sprayed through the outlet of the passage 41. On the other hand, high pressure steam controlled under a pressure of 13 kg/cm$^2$ and at a temperature of about 180° C. was spouted through the passage 44 to the chamber 43 communicated with the throat portion 42. Further, an aqueous solution of a dispersant prepared by dissolving 15 parts of methyl cellulose and 35 parts of PELEX TR (sodium dialkylsulfosuccinate manufactured by Kao-Atlas) in 1000 parts of water was spouted from the passage 45 to the throat portion 42. This three-fluid flow type nozzle was installed in the manner shown in FIG. 1, so that the co-melt and the aqueous solution of dispersant were sprayed into the arresting chamber 12 which was maintained at about 60° C. by passing water of 5° C. through the jacket 13 and the cooled and solidified fine particles were collected in the reservoir 16. At the beginning of the operation the reservoir 16 was empty and contained no dispersion medium therein. And accordingly there was no need of use of shower nozzles 18. In this case, the flow rates of the co-melt, the aqueous solution of dispersant, and the steam were 0.1 kg/min, 0.2 kg/min, and 0.5 kg/min, respectively.

As a result, the average particle size of the co-melt obtained was 4 microns, and the particle size distribution was more uniform than in Examples 1 and 2. The temperature of the co-melt dispersion obtained in the reservoir 16 was about 60° C. and the content of the co-melt particles was 25% by weight.

(2) Preparation of A liquid:

It was prepared in the same manner as in (2) of Example 1.

(3) Preparation of B liquid:

It was prepared in the same manner as in (3) of Example 1.

(4) Formation of a recording layer:

| | |
|---|---|
| A liquid | 200 parts |
| B liquid | 100 parts |

A coating composition prepared by mixing the A and B liquids in the above ratio was applied under the same conditions as in Example 1, whereby a heat-sensitive record material was obtained.

EXAMPLE 4

(1) Treatment for incorporation of a colorless chromogenic material and a heat fusible material using a three-fluid flow type nozzle:

The similar treatment to that in Example 3 was conducted except that no positive temperature control for the arresting chamber 12 was made. Unexpectedly, the average particle size of co-melt obtained was about 4 microns and the particle size distribution was substantially the same as that in Example 3. The temperature of the dispersion obtained in the reservoir 16 was about 85° C. and the content of the co-melt in the dispersion was 28% by weight.

(2) Preparation of A liquid:

It was prepared in the same manner as in (2) of Example 1.

(3) Preparation of B liquid:

It was prepared in the same manner as in (3) of Example 1.

(4) Formation of a recording layer:

| | |
|---|---|
| A liquid | 200 parts |

-continued

| | |
|---|---|
| B liquid | 100 parts |

A coating composition prepared by mixing the A and B liquids in the above ratio was applied to a paper sheet under the same conditions as those in Example 1 to form a heat-sensitive record material.

Control 1

For comparison, a heat-sensitive record material was prepared under the same conditions as those for the method described in the previous patent application (Japanese Laid-Open Patent Publication No. 48,751 of 1978 corresponding to U.S. Pat. No. 4,236,732). That is, (1) Treatment for incorporation of a colorless chromogenic material and a heat-meltable material:

The composition mentioned in (1) of Example 1 was melted at 165° C. and then cooled and solidified, and coarsely crushed.

(2) Preparation of A liquid:

| | |
|---|---|
| The aforesaid co-melt material thus prepared | 100 parts |
| Kaolin | 20 parts |
| 10% aqueous solution of polyvinyl alcohol | 300 parts |

The above components were mixed in the above ratio, and the resulting composition was pulverized by a sand mill until an average particle size of 4 microns was obtained.

(3) Preparation of B liquid:

It was prepared in the same manner as in (3) of Example 1.

(4) Formation of a recording layer:

| | |
|---|---|
| A liquid | 200 parts |
| B liquid | 100 parts |

A coating composition prepared by mixing the A and B liquids in the above ratio was applied under the same conditions as those used in Example 1, whereby a heat-sensitive record material was obtained.

The heat-sensitive record material obtained in Examples 1, 2, 3 and 4 and Control 1 were tested for the γ-characteristic and the color development sensitivity assessed from the relation between the applied temperature and the developed color density. More particularly, a record material sheet was pressed (4 kg/cm$^2$) against a temperature-controlled hot plate for 5 seconds, and after developed color images were obtained for individual temperatures, the reflection densities of these images were measured with Macbeth densitometer, Model RD-100R (manufactured by Macbeth Corporation, USA). The test results were as follows.

| | Applied temperature | | | | | | |
|---|---|---|---|---|---|---|---|
| Developed color density | 60° C. | 70° C. | 80° C. | 90° C. | 100° C. | 111° C. | 120° C. |
| Example 1 | 0.03 | 0.09 | 0.83 | 1.10 | 1.18 | 1.26 | 1.24 |
| Example 2 | 0.03 | 0.09 | 0.87 | 1.12 | 1.18 | 1.26 | 1.26 |
| Example 3 | 0.03 | 0.10 | 0.90 | 1.14 | 1.22 | 1.27 | 1.27 |
| Example 4 | 0.03 | 0.10 | 0.90 | 1.13 | 1.22 | 1.26 | 1.27 |
| Control 1 | 0.03 | 0.09 | 0.79 | 1.09 | 1.16 | 1.21 | 1.23 |

The γ-characteristic represents the rising tendency of color developing. A larger γ-value indicates that the maximum density is rapidly reached. The color developing sensibility is generally defined with a temperature in which the color density of the obtained color image becomes 0.8. The temperature being low indicates that the color developing sensibility is superior.

As shown in the above table, the heat-sensitive record material obtained in each of Examples 1 to 4 has a large γ-characteristic and a good color developing sensibility in comparison with that in Control 1.

Further, the record material sheets from Examples 1, 2, 3 and 4 and Control 1 were used for recording (the applied voltage to the thermal head being 18 V) with Toshiba's Model KB-600 heat-sensitive fascimile system, and their developed color densities were compared. As a result, it was found that the developed color images in the examples of the invention were higher in density and more distinct than that in the control. Further, a comparison of the examples of the invention with each other showed that Examples 3 and 4, 2, 1 were in the descending order of superiority and that particularly Examples 3 and 4 were decidedly superior.

This invention is characterized in the manner described above. Thus, in atomizing or reducing the particle size of a heat fusible material having a colorless chromogenic material or acceptor dissolved therein for preparing a coating composition for the heat-sensitive record material, the use of a single-fluid, two-fluid or three-fluid flow type nozzle makes it possible to prepare the required coating composition much more efficiently than using the conventional method. The heat response and the recording density of the heat-sensitive record material obtained are very good.

What we claim is:

1. In a method for preparing a coating composition for use to produce heat-sensitive record material comprising a base sheet having a color developing layer which includes finely divided particles comprising colorless chromogenic material and finely divided particles comprising acceptor which is reactive with said colorless chromogenic material to develop a color, at least one of said two kinds of finely divided particles further including a heat fusible material having a melting point within the range of 60° C. to 200° C., said heat fusible material being capable of dissolving at least one of said colorless chromogenic material and said acceptor therein when melted, the improvement comprising the steps of:

admixing and heating at least one colorless chromogenic material or acceptor and at least one heat fusible material to form a co-melt, atomizing said co-melt with a three-fluid type spray nozzle in which three different kinds of fluids comprising, respectively, said co-melt, an aqueous solution of a dispersing agent and high pressure steam or air, flow through three respective passages in said nozzle meeting at a common junction where said fluids are uniformly admixed and stirred before they are sprayed together from an opening in said nozzle to form finely divided particles comprising said colorless chromogenic material or acceptor and said heat fusible material, and preparing a coating composition including said finely divided particles dispersed therein.

2. A method as defined in claim 1, in which the average particle size of said finely divided particles is smaller than 5 microns.

3. A method as defined in claim 1, in which the outflow rate of said co-melt is less than half that of said high pressure steam or air.

4. A method as defined in claim 1, in which the outflow pressure of said high pressure steam or air spouted through said nozzle is higher than 3 $kg/cm^2$.

5. A method as defined in claim 1 wherein said atomized co-melt particles are received and collected in a reservoir which is cooled at a temperature lower than the melting point of the co-melt.

6. A method as defined in claim 5 wherein said cooling temperature is at least 10° C. lower than the melting point of the co-melt.

7. A method as defined in claim 5 wherein said reservoir contains a dispersion medium.

8. A method as defined in claim 7 wherein said dispersion medium comprises water and a dispersion agent.

9. A method as defined in claim 5 wherein a 20% to 30% aqueous dispersion of said finely divided particles of the co-melt are prepared in said reservoir.

10. A method as defined in claim 1 wherein said atomized co-melt particles are solidified by cooling at a temperature lower than the melting point of the co-melt and then are received and collected in a reservoir.

11. A method as defined in claim 10 wherein said cooling temperature is at least 10° C. lower than the melting point of the co-melt.

12. A method as defined in claim 10 wherein said reservoir contains a dispersion medium.

13. A method as defined in claim 12 wherein said dispersion medium comprises water and a dispersing agent.

* * * * *